United States Patent
Ohtomo et al.

(10) Patent No.: US 8,383,759 B2
(45) Date of Patent: Feb. 26, 2013

(54) METHOD FOR PRODUCING LIQUID CRYSTAL POLYESTER

(75) Inventors: Shinji Ohtomo, Tsukuba (JP); Tadashi Fukunaka, Niihama (JP); Yi Zhang, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/429,954

(22) Filed: Mar. 26, 2012

(65) Prior Publication Data

US 2012/0253003 A1    Oct. 4, 2012

(30) Foreign Application Priority Data

Mar. 29, 2011   (JP) ................. 2011-072010

(51) Int. Cl.
  *C08G 63/18*   (2006.01)
  *C08G 63/52*   (2006.01)
(52) U.S. Cl. ....................... 528/305; 525/437
(58) Field of Classification Search .................. 528/305; 525/437
See application file for complete search history.

(56) References Cited

U.S. PATENT DOCUMENTS

2003/0088053 A1   5/2003   Ohbe et al.

FOREIGN PATENT DOCUMENTS

| JP | 2001072750 A | 3/2001 |
|---|---|---|
| JP | 2008248095 A | 10/2008 |

*Primary Examiner* — Terressa Boykin
(74) *Attorney, Agent, or Firm* — Panitch Schwarze Belisario & Nadel LLP

(57) ABSTRACT

A method is provided for producing a liquid crystal polyester including: (1) polycondensing a mixture of a compound of formula (I) with a compound of formula (II) in a polymerization tank at 260 to 350° C. to form a prepolymer, wherein a ratio of by-products to be distilled off to the theoretical amount of by-products formed when the compound of formula (I) is polycondensed with the compound of formula (II) in a stoichiometric relation is 95% or more; (2) continuously discharging the prepolymer from the polymerization tank in a molten state, solidifying the prepolymer while transferring, and continuously grinding the solidified prepolymer by a grinder provided downstream in a transfer direction to produce prepolymer particles; and (3) heat-treating the prepolymer particles in their solid state under an inert gas atmosphere, thereby subjecting them to solid phase polymerization.

4 Claims, 1 Drawing Sheet

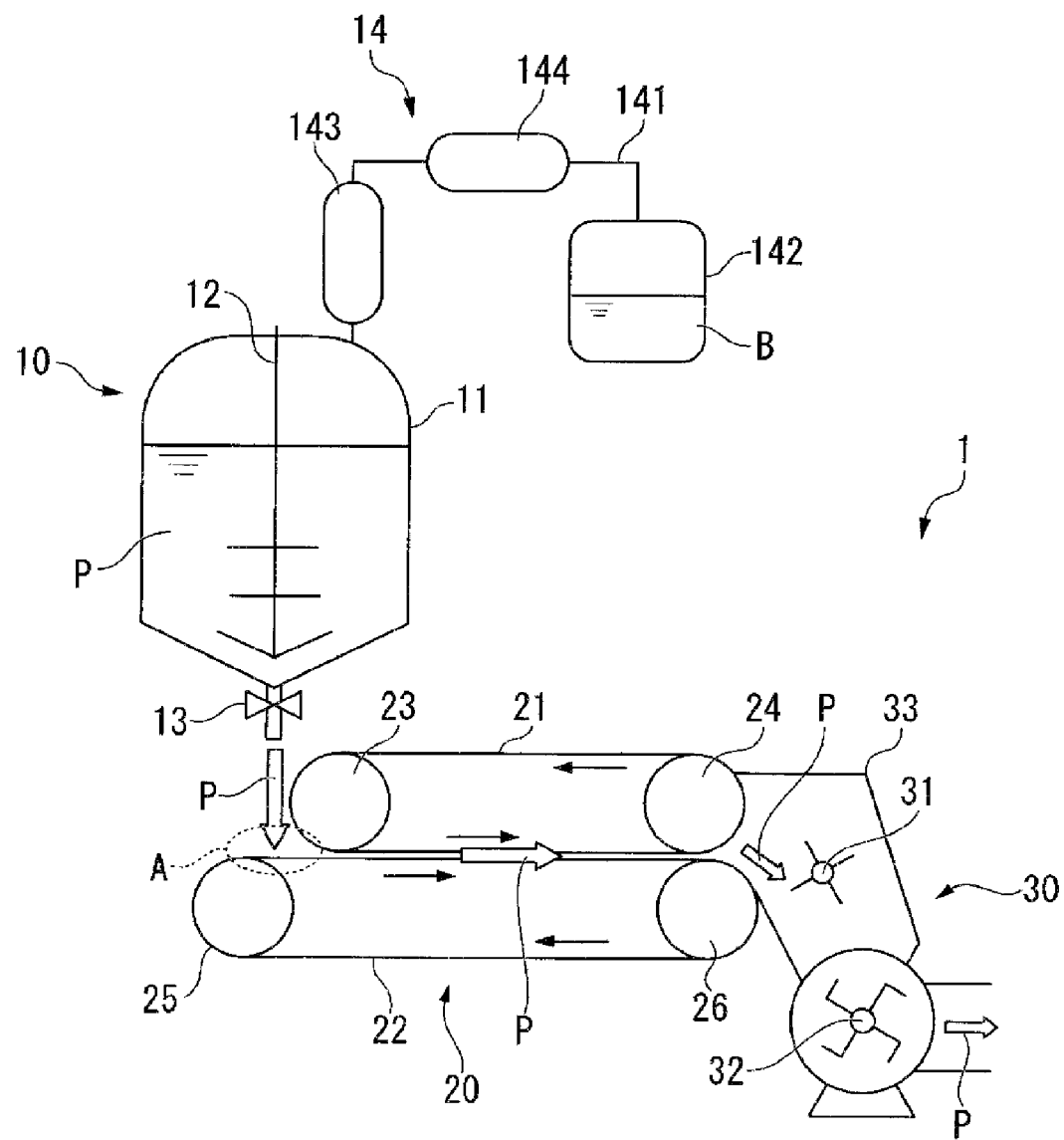

METHOD FOR PRODUCING LIQUID CRYSTAL POLYESTER

BACKGROUND OF THE INVENTION

1. Field of the Invention

The present invention relates to a method for producing a liquid crystal polyester.

2. Description of Related Art

JP-A-2001-72750 (corresponding application is US2003-0088053A) discloses, as a method for producing a liquid crystal polyester having a high molecular weight with satisfactory productivity, a method for producing a liquid crystal polyester comprising the steps of (1) polycondensing a monomer in a reaction vessel, (2) removing the formed polymer in a molten state from the reaction vessel and solidifying the polymer, and (3) subjecting the solidified polymer to a solid phase reaction.

There has been known, as the facility to be used in such a production method, a facility composed of a belt cooler for cooling and a grinder (see JP-A-2008-248095). The polymer obtained in the above step (1) is solidified by being discharged on the belt cooler for cooling, and also transferred to the downstream side, and the solidified polymer is ground by a grinder provided at the end of the downstream side of the belt cooler. Fine particles of the polymer can be easily obtained by this facility.

The facility disclosed in the above-mentioned JP-A-2008-248095 enables the production of fine particles of the polymer by discharging the polymer formed by polycondensation from a reaction vessel in a molten state, followed by solidification, transfer and further grinding. However, the facility cannot be necessarily satisfactory in that it "discharges stably and continuously".

SUMMARY OF THE INVENTION

Under such a circumstance, the present invention has been made and an object thereof is to provide a method for producing a liquid crystal polyester, which can stably and continuously discharge the polymer formed by polycondensation from a reaction vessel in a molten state.

In order to achieve the above object, the present invention provides a method for producing a liquid crystal polyester, which includes the following steps of:

(1) polycondensing a mixture of 65 to 80 mol % of a compound represented by the following formula (I) with 20 to 35 mol % of a compound represented by the following formula (II) (the total of both compounds is 100 mol %) in a polymerization tank at 260 to 350° C. to form a prepolymer while distilled off by-products to be formed, wherein (1-1) the by-products contain a compound in which $R^1$ and X eliminated from the compound represented by the formula (I) and the compound represented by the formula (II) are bonded, and (1-2) a ratio of by-products to be distilled off to the theoretical amount of by-products formed when the compound represented by the formula (I) is polycondensed with the compound represented by the formula (II) in a stoichiometric relation becomes 95% or more;

(2) continuously discharging the prepolymer from the polymerization tank in a molten state, solidifying the prepolymer while successively transferring in one direction, and continuously grinding the solidified prepolymer by a grinder provided at the downstream in a transfer direction to produce prepolymer particles; and (3) heat-treating the prepolymer particles in their solid state under an inert gas atmosphere, thereby subjecting them to solid phase polymerization:

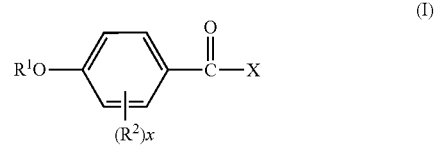

wherein $R^1$ represents a hydrogen atom, a formyl group, an acetyl group, a propionyl group or a benzoyl group; $R^2$ represents a chlorine atom, a bromine atop, or a group selected from the group consisting of a methyl group, an ethyl group, a propyl group, an isopropyl group, a butyl group, an isobutyl group and a tertiary butyl group; X represents a hydroxy group, an organyloxy group, a halogen atom or an acyloxy group; and x is an integer of 0 to 4 and, when x is 2, 3 or 4, a plurality of $R^2$(s) are the same or different from each other; and

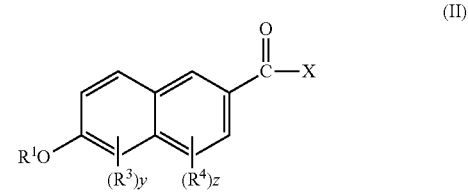

wherein $R^1$ and X respectively have the same meanings as those of $R^1$ and X in the formula (I), and are respectively the same as or different from each other from $R^1$ and X in the formula (I); $R^3$ and $R^4$ each independently represents a chlorine atom or a group selected from the group consisting of a methyl group, an ethyl group, a propyl group, an isopropyl group, a butyl group, an isobutyl group and a tertiary butyl group; y is an integer of 0 to 3 and, when y is 2 or 3, a plurality of $R^3$(s) are the same or different from each other; and z is an integer of 0 to 3 and, when z is 2 or 3, a plurality of $R^4$(s) are the same or different from each other.

According to the present invention, it is possible to provide a method for producing a liquid crystal polyester, which can stably and continuously discharge the prepolymer formed in the step (1) from a polymerization tank in a molten state.

BRIEF DESCRIPTION OF THE DRAWINGS

FIG. 1 is a schematic view showing a production device which can be used in the steps (1) and (2) of a production method of the present invention.

The size and proportion of each component of this production device are different from actual size and proportion for simplicity of the drawing. In the drawing, the reference numeral 1 denotes a production device, 10 denotes a polymerization device, 11 denotes a polymerization tank, 12 denotes a stirrer, 14 denotes a recovery device, 20 denotes a cooling device, 30 denotes a grinding device, 31 denotes a first grinder, 31 denotes a second grinder, and P denotes a prepolymer.

DETAILED DESCRIPTION OF THE INVENTION

The present invention will be described with reference to FIG. 1.

The production device 1 shown in FIG. 1 includes a polymerization device 10 according to the step (1) of producing a prepolymer P, a cooling device 20 according to the step (2) of solidifying the prepolymer P discharged from the polymerization device 10 by transferring in a horizontal direction while cooling, and a grinding device 30 according to the step (2) of grinding the solidified prepolymer P. The prepolymer P ground by the grinding device 30 is transferred to a solid phase polymerization facility according to the step (3) (not shown) and subjected to solid phase polymerization.

The polymerization device 10 includes a polymerization tank 11, a stirrer 12 provided in the polymerization tank 11, and a valve 13 which controls the discharge amount of a prepolymer provided at the lower portion of the polymerization tank 11. A recovery device 14, which recovers a substance containing by-products B formed in the step (1) by distillation-off, is provided at the upper portion of the polymerization tank 11. The recovery device 14 includes a piping 141 whose one end is connected to the polymerization tank 11, and a tank 142 to which the other end of the piping 141 is connected, and a first cooler 143 and a second cooler 144, which cool by-products B vaporized from the side of the polymerization tank 11, are provided in the piping 141.

A cooling device 20 is a double belt type cooler, and is a device in which an upper belt 21 and a lower belt 22 as endless belts are vertically disposed in close contact with each other, and a prepolymer is interposed between the upper belt 21 and the lower belt 22 and then solidified by cooling while transferring.

The upper belt 21 and lower belt 22 are belts made of metal, which have corrosion resistance, such as a steel belt. Similarly, the upper belt 21 and lower belt 22 are cooled by cooling water (not shown).

The upper belt 21 is wound between a first roller 23 and a second roller 24, and is provided in a tensioned state between these rollers. Similarly, the lower belt 22 is wound between a first roller 25 and a second roller 26, and is provided in a tensioned state between these rollers.

The prepolymer P produced by the polymerization device 10 is discharged on a top surface (denoted by the symbol A in the drawing) of the lower belt 22 in the cooling device 20. The upper belt 21 and lower belt 22 are transferred to the downstream side while interposing the prepolymer P between the upper belt 21 and lower belt 22 by driving each roller. The prepolymer P is solidified by cooling while transferring in a state of being interposed in the cooling device 20.

The gap between the upper belt 21 and lower belt 22 is preferably from about 1 mm to 2 mm. The length and transfer rate of the upper belt 21 and lower belt 22 are set according to the cooling temperature of the target prepolymer P.

The prepolymer P, which is cooled by the cooling device 20 and transferred, is fed to a grinding device 30. The grinding device 30 includes a first grinder 31 disposed at the upstream side, a second grinder 32 disposed at the downstream side, and a cover 33 for preventing scattering of the prepolymer P.

The first grinder 31 and second grinder 32 are rotary bodies including innumerable bar-shaped, protrusion-shaped or hook-shaped grinding teeth provided in axial and circumferential directions of a cylindrical core material, and grind the prepolymer P solidified in the form of a plate by rotating around the core material as a central axis.

When the prepolymer P is not continuously discharge from the polymerization device 10 (for example, when the prepolymer P is intermittently discharged on the cooling device 20), the prepolymer P is sometimes solidified in the form of a disk in the cooling device 20. When the solidified prepolymer P is fed to the grinding device 30 in such a manner, the prepolymer P may fit between grinding teeth of the first grinder 31 or second grinder 32, and thus causing blocking of the grinding device 30.

"Continuously discharge" in the step (2) means that the prepolymer P is continuously discharged without a break. When the prepolymer P is continuously discharged, the prepolymer P is formed into a series of connected belt-shaped solid on the cooling device 20, and then fed stably and continuously to the grinding device 30.

It has hitherto been considered to be necessary to control polycondensation so as to prevent the viscosity of a prepolymer P from excessively increasing, in order to facilitate discharge of the prepolymer P. Therefore, since high polymerization conversion rate of the prepolymer P leads to an increase in viscosity of the prepolymer P, it was considered to be disadvantageous so as to continuously discharge the prepolymer. The polymerization conversion rate means the proportion of the formed polymer based on the total amount of the monomer, and the polymerization conversion rate is 100% when the residual monomer disappears.

However, the present inventors have studied about method for producing a liquid crystal polyester, which enables stable production, and found that it is possible to continuously discharge a prepolymer from a polymerization tank in a molten state from the viewpoint which is different from that of the prior art. Thus, the present invention has been completed.

The organyloxy group of X is preferably a methoxy group, an ethoxy group, a propoxy group, a benzyloxy group or a phenoxy group.

In the formula (II), $R^3$ is a group capable of bonding at 5-, 7- or 8-position of a naphthylene group, and $R^4$ is a group capable of bonding at 1-, 3- or 4-position of a naphthylene group.

The flow initiation temperature in the present invention is also called a flow temperature and means a temperature at which a melt viscosity becomes 4,800 Pa·s (48,000 poise) when a liquid crystal polyester is melted while heating at a heating rate of 4° C./min under a load of 9.8 MPa (100 kg/cm$^2$) and extruded through a nozzle having an inner diameter of 1 mm and a length of 10 mm using a capillary rheometer, and the flow initiation temperature serves as an index indicating a molecular weight of the liquid crystal polyester (see "Liquid Crystalline Polymer Synthesis, Molding, and Application" edited by Naoyuki Koide, page 95, published by CMC on Jun. 5, 1987).

Examples of the compound represented by the formula (I) include aromatic hydroxycarboxylic acids such as 4-hydroxybenzoic acid, 4-formoxybenzoic acid, 4-acetoxybenzoic acid and 4-propionyloxybenzoic acid; and aromatic hydroxycarboxylic acid esters such as methyl 4-hydroxybenzoate, propyl 4-hydroxybenzoate, phenyl 4-hydroxybenzoate, benzyl 4-hydroxybenzoate, methyl 4-acetoxybenzoate and phenyl 4-acetoxybenzoate. Among these compounds, 4-hydroxybenzoic acid or 4-acetoxybenzoic acid is particularly preferable.

Examples of the derivative of the aromatic hydroxycarboxylic acid other than those mentioned above, which is the compound represented by the formula (I), include acid halides obtained by converting a carboxyl group into a haloformyl group; acid anhydrides obtained by converting a carboxyl group into an acyloxycarbonyl group; and acylates obtained by converting a hydroxyl group into an acyloxyl group through acylation.

Examples of the compound represented by the formula (I) further include 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid and 3-bromo-4-hydroxybenzoic acid. These compounds can also be used in combination with the above-mentioned compounds for the purpose of improving gas barrier properties of the liquid crystal polyester. These compounds are compounds in which $R^1$ in the formula (I) is a hydrogen atom and X is a hydroxy group, and $R^1$ and X may be other groups defined in the present invention.

The compound represented by the formula (I) to be used in the step (1) may be a combination of a plurality of compounds in which at least one of $R^1$, $R^2$ and X in the formula (I) may be different from each other.

Examples of the compound represented by the formula (II) include aromatic hydroxycarboxylic acids such as 6-hydroxy-2-naphthoic acid and 6-acetoxy-2-naphthoic acid; and aromatic hydroxycarboxylic acid esters such as methyl 6-hydroxy-2-naphthoate, phenyl 6-hydroxy-2-naphthoate and methyl 6-acetoxy-2-naphthoate. Among these compounds, 6-hydroxy-2-naphthoic acid or 6-acetoxy-2-naphthoic acid is particularly preferable.

Examples of the derivative of the aromatic hydroxycarboxylic acid other than those mentioned above, which is the compound represented by the formula (II), include acid halides obtained by converting a carboxyl group into a haloformyl group; acid anhydrides obtained by converting a carboxyl group into an acyloxycarbonyl group; and acylates obtained by converting a hydroxyl group into an acyloxyl group through acylation.

Examples of the compound represented by the formula (II) further include 6-hydroxy-5-chloro-2-naphthoic acid, 6-hydroxy-7-chloro-2-naphthoic acid and 6-hydroxy-4,7-dichloro-2-naphthoic acid. These compounds can also be used in combination with the above-mentioned compounds for the purpose of improving gas barrier properties of the liquid crystal polyester. These compounds are compounds in which $R^1$ in the formula (II) is a hydrogen atom and X is a hydroxy group, and $R^1$ and X may be other groups defined in the present invention.

The compound represented by the formula (II) to be used in the step (1) may be a combination of a plurality of compounds in which at least one of $R^1$, $R^3$, $R^4$ and X in the formula (II) may be different from each other.

In the present invention, as long as an important influence is not exerted on physical properties and processability of the obtained liquid crystal polyester, it is possible to use compounds such as 3-hydroxybenzoic acid, 3-formoxybenzoic acid, 3-acetoxybenzoic acid, 3-propionyloxybenzoic acid, methyl 3-hydroxybenzoate, propyl 3-hydroxybenzoate, phenyl 3-hydroxybenzoate, benzyl 3-hydroxybenzoate, methyl 3-acetoxybenzoate, 4'-hydroxybiphenyl-4-carboxylic acid and 4'-acetoxybiphenyl-4-carboxylic acid in combination with compounds represented by the formulas (I) and (II).

The production method of the present invention will be described in detail below every step.

In the step (1), a mixture of a compound represented by the formula (I) with a compound represented by the formula (II) is polycondensed in a polymerization tank. These compounds are charged in the reaction vessel in the form of the mixture, or separately charged in the reaction vessel.

When a compound having a phenolic hydroxyl group (in case $R^1$ is a hydrogen atom) is used as the compound represented by the formula (I) or compound represented by the formula (II), it is preferred to perform the reaction for increasing reactivity of the phenolic hydroxyl group before polycondensation. Examples of the reaction include an acylation reaction of a phenolic hydroxyl group with acid anhydride such as acetic anhydride (for example, acetylation reaction), namely, an esterification reaction between the acid anhydride and the phenolic hydroxyl group. The reaction is performed in (1) a reaction vessel which is different from that for performing polycondensation, or (2) a reaction vessel which is the same as that for performing polycondensation. Among these, an aspect (2) is preferable from the viewpoint of simplicity of an operation capable of still performing polycondensation continuously. In the present invention, the production method is preferably a method in which the compound represented by the formula (I) is 4-acetoxybenzoic acid formed by an acetylation reaction of a phenolic hydroxyl group of 4-hydroxybenzoic acid with acetic anhydride in the step (1), and the compound represented by the formula (II) is 6-acetoxy-2-naphthoic acid formed by an acetylation reaction of a phenolic hydroxyl group of 6-hydroxy-2-naphthoic acid with acetic anhydride in the step (1).

The use amount of the acid anhydride (for example, acetic anhydride) in the above-mentioned esterification reaction is preferably an equivalent amount or more based on the total of the amount of the phenolic hydroxyl group of the compound represented by the formula (I) (for example, 4-hydroxybenzoic acid) and the amount of the phenolic hydroxyl group of the compound represented by the formula (II) (for example, 6-hydroxy-2-naphthoic acid), and more preferably from 1.03 to 1.30 equivalents.

Examples of the material of the reaction vessel for performing the esterification reaction include materials having corrosion resistance, such as titanium and hastelloy B. When the objective liquid crystal polyester is required high color tone (L value), the material of the inner wall of the reaction vessel is preferably glass. Examples of the reaction vessel in which the material of an inner wall is glass include a reaction vessel which is entirely made of glass, and a reaction vessel made of SUS, whose inner wall is glass-lined. Among these reaction vessels, a reaction vessel whose inner wall is glass-lined is preferable in a large-sized production facility. Namely, in the present invention, the step (1) is preferably performed in the reaction vessel whose inner wall is glass-lined.

The polycondensation of the step (1) can be performed in an atmosphere of an inert gas such as nitrogen under the conditions of a normal or reduced pressure. It is particularly preferred that the polycondensation is performed in an inert gas atmosphere under a normal pressure. The polycondensation is performed in a batch-wise or continuous manner or a combination thereof.

The temperature of the polycondensation is from 260 to 350° C., and preferably from 270 to 330° C. When the temperature is lower than 260° C., the polycondensation proceeds slowly. In contrast, when the temperature is higher than 350° C., side reactions such as decomposition of the polymer are likely to occur. When the polymerization tank of the step (1) is composed of a division divided into multi-stages or partitioned plural divisions and the temperature of the polycondensation of each division is not the same, the above "polycondensation temperature" means the highest temperature among them.

The time of the polycondensation should be appropriately determined based on other reaction conditions, and is preferably from 0.5 to 5 hours at the temperature of the polycondensation.

The polycondensation sufficiently proceeds even in the absence of a catalyst, but compounds such as (1) oxide and (2) acetate of elements such as Ge, Sn, Ti, Sb, Co and Mn may be optionally used as the catalyst. Use of the catalyst and the kind of the catalyst when used may be determined according to the intended use of the liquid crystal polyester. For example, the liquid crystal polyester to be used in foodrelated applications is preferably produced in the absence of a catalyst. In the case of the liquid crystal polyester produced by using the catalyst, a catalyst component contained therein must be removed according to the intended use in some cases.

The polymerization tank to be used in the polycondensation may be a polymerization tank having a known shape. In the case of a vertical polymerization tank, the stirring blade is preferably a multi-stage paddle blade, a turbine blade, a monte blade or a double helical blade, and more preferably a multi-stage paddle blade or a turbine blade. A lateral polymerization tank is preferably a polymerization tank provided with a blade having a specific shape, such as a lens blade, an eyeglass blade or an elliptical flat-plate blade in a vertical direction of a single or twin stirring shaft. In order to improve stirring performances and feed mechanism, the blade may be provided with torsion.

The polymerization tank is heated by a heat medium, a gas or an electric heater. In order to uniformly heat a reaction product in the polymerization tank, it is preferred to heat not only the polymerization tank but also members to be immersed in the reaction product, such as a stirring shaft, a blade and a baffle plate.

The step (1) is the step of producing a prepolymer while distilling off by-products formed by polycondensation, and (1-1) the by-products contain a compound in which $R^1$ and X eliminated from the compound represented by the formula (I) and the compound represented by the formula (II) are bonded, and (1-2) the polycondensation is continued until a ratio of by-products to be distilled off to the theoretical amount of by-products formed when the compound represented by the formula (I) is polycondensed with the compound represented by the formula (II) in a stoichiometric relation (hereinafter referred to as "recovery ratio") becomes 95% or more.

The recovery ratio can be determined from the amount of by-products collected in a tank 142 of FIG. 1.

Other substances such as a monomer (raw compound) are sometimes distilled off, together with by-products such as acetic acid and acetic anhydride. When the amount of other substances is very small as compared with the amount of acetic acid and acetic anhydride, the amount of by-product is calculated by ignoring the amount of other substances or taking the amount of other substances into consideration.

When 4-hydroxybenzoic acid is used as the compound represented by the formula (I) and 6-hydroxy-2-naphthoic acid is used as the compound represented by the formula (II), and polycondensation is performed after esterifying phenolic hydroxyl groups of both compounds with acetic anhydride, acetic acid is formed as by-products of the polycondensation. Since acetic acid is likely to be distilled off by vaporization under the conditions of polycondensation, the polycondensation and distillation-off of acetic acid proceed nearly simultaneously. Therefore, the polymerization conversion rate of the polycondensation can be roughly estimated from a recovery ratio of by-products such as acetic acid.

The discharge of the prepolymer from the polymerization tank in the step (2) is preferably performed in an atmosphere of an inert gas such as a nitrogen gas or an atmosphere of air containing less moisture so as not to cause deterioration of color tone of the obtained liquid crystal polyester. The discharge is preferably performed in a state where the atmosphere in the polymerization tank is pressurized within a range from 0.1 to 2 $kg/cm^2G$ (gauge pressure), and more preferably from 0.2 to 1 $kg/cm^2G$, using an inert gas such as nitrogen (atmospheric pressure is assumed to be 1.033 $kg/cm^2A$). The discharge under pressure enables (1) suppression of the formation of by-products in the step (2), and (2) prevention of shift equilibrium of the polycondensation reaction to the side of the formation of the prepolymer, resulting in suppression of an increase in molecular weight of the prepolymer. As a result, an increase in flow initiation temperature of the prepolymer is suppressed.

Examples of the facility for the discharge of the prepolymer in a molten state include an extruder, a gear pump and a valve. After discharging the prepolymer for a while, the prepolymer is solidified. Therefore, the solidified prepolymer is ground by a strand cutter or a sheet cutter. Examples of the means for discharging a large amount of the prepolymer within a short time, followed by solidification include a method of cooling by a double-belt cooler through a weight or volumetric counting feeder described in JP-A-6-256485.

Examples of the method of cleaning a polymerization tank after discharging the prepolymer include a method using glycols and/or amines described in JP-A-5-29592 and JP-A-5-29593.

The solidified prepolymer is preferably ground to a particle size of 3 mm or less, more preferably 0.5 mm or less, and more preferably from 0.1 to 0.4 mm, by "grinding" of the step (2) to obtain prepolymer particles. The grinding can be performed using a known grinder. The above-mentioned "size" of particles means the size of particles which pass through (or do not pass through) a sieve having an opening size of the size. For example, "particles having a particle size of 3 mm or less" mean particles which pass through a sieve having an opening size of 3 mm, and "particles having a particle size of 0.1 to 0.4 mm" mean particles which pass through a sieve having an opening size of 0.4 mm and do not pass through a sieve having an opening size of 0.1 mm. When the particle size is more than 3 mm, (1) a difference between the molecular weight of a surface layer of the liquid crystal polyester particles obtained in the step (3) and the molecular weight inside the particles increases, and thus molecular weight distribution of the whole liquid crystal polyester particles may become wide, and (2) a volatile component in prepolymer particles is not sufficiently removed in the step (3), and thus causing foaming and generation of a gas. The reason why "difference in molecular weight increases" of the above-mentioned (1) is that the surface layer and inside of the particles are different from each other in the polymerization rate and diffusion time of by-products in the step (3).

By the heat treatment of the step (3), (1) prepolymer is further polycondensed to form a liquid crystal polyester having an increased molecular weight, and (2) by-products such as an unreacted material (monomer) and acetic acid contained in prepolymer particles are distilled off.

The temperature rise rate and maximum treating temperature upon the solid phase polymerization are set so that particles of the formed liquid crystal polyester are not welded to each other. Welding is not preferred from the viewpoint of (1) a decrease in surface area of particles of the liquid crystal polyester, (2) a decrease in rate of solid phase polymerization, and (3) a decrease in rate of transpiration of a low boiling point component. The temperature rise rate is preferably from 0.05 to 0.25° C./minute, and more preferably from 0.10 to 0.20° C./minute. The maximum treating temperature is from 200 to 310° C., and preferably from 230 to 300° C. or lower. When the maximum treating temperature is lower than 200° C., the rate of the solid phase polymerization decreases and thus the time of the heat treatment increases, resulting in lack of economy. In contrast, when the maximum treating temperature is higher than 310° C., (1) particles of the liquid crystal polyester may be welded to each other, and (2) the particles may be melted, and thus it is impossible to maintain a solid phase state. The time of the heat treatment is preferably from 1 to 24 hours.

Examples of the device of the solid phase polymerization include various known devices capable of heat-treating a powder, such as a dryer, a reactor, a mixer and an electric furnace. Among these devices, a gas circulating device with high degree of sealing is preferable since the solid phase polymerization can be performed under an inert gas atmosphere.

The above-mentioned inert gas is preferably nitrogen, helium, argon or a carbon dioxide gas, and more preferably nitrogen. The flow rate of the inert gas is determined taking account of factors such as volume of the device of the solid phase polymerization, and particle size and filling state of prepolymer particles, and is usually from 2 to 8 m³/hour, and preferably from 3 to 6 m³/hour, per 1 m³ of the device of the solid phase polymerization. When the flow rate is less than 2 m³/hour, the rate of the solid phase polymerization is slow. In contrast, when the rate is more than 8 m³/hour, scattering of particles may occur in some cases.

The liquid crystal polyester obtained by the production method of the present invention includes 20 to 80 units of the following repeating unit (A) derived from a compound represented by the formula (I), and 20 to 80 units of the following repeating unit (B) derived from a compound represented by the formula (II):

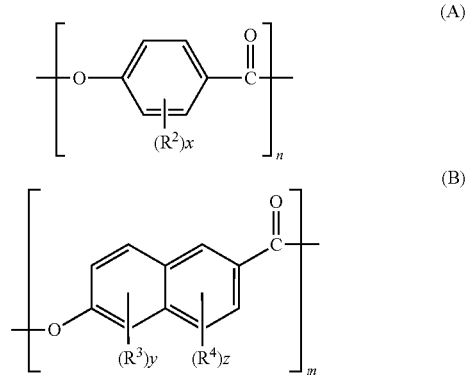

wherein the total of the repeating unit (A) and the repeating unit (B) included in the liquid crystal polyester is 100 units; all symbols described in the repeating units (A) and (B) have the same meanings as those described in the formulas (I) and (II), excluding n and m; n is an integer which denotes the repeating number of repeating unit (A); and m is an integer which denotes the repeating number of repeating unit (B).

The flow temperature of the liquid crystal polyester obtained by the production method of the present invention is preferably from 210 to 320° C., more preferably from 220 to 300° C., and still more preferably from 230 to 280° C. When the flow temperature is higher than 320° C., the processing temperature of the liquid crystal polyester may be higher than 350° C. in some cases, which is not preferable.

The liquid crystal polyester obtained by the production method of the present invention can be preferably granulated into the form of pellets after melting.

Examples of the method of granulating into pellets include a method in which a liquid crystal polyester is melt-kneaded using a commonly used single- or twin-screw extruder, air-cooled or water cooled and then formed into pellets using a pelletizer (strand cutter). Among commonly used extruders, an extruder with large L/D is preferable so as to uniformly melt and form the liquid crystal polyester. The setting temperature (die head temperature) of a cylinder of the extruder is preferably from 200 to 350° C., more preferably from 230 to 330° C., and still more preferably from 240 to 320° C.

The pellets of the liquid crystal polyester can also be obtained by a method including the following steps of:
(i) removing a prepolymer in a molten state on parallel rollers with a groove, solidifying the prepolymer into a shape of a strand (string), and then cutting the strand (corresponding to grinding) to produce pellet-shaped particles having a particle size of 3 mm or less (corresponding to the above (2)); and
(ii) heat-treating the pellet-shaped prepolymer particles under circulation of an inert gas while remaining in a solid phase state (corresponding to the above step (3)).

Inorganic fillers can be optionally added to the liquid crystal polyester produced by the production method of the present invention. Examples of inorganic fillers include calcium carbonate, talc, clay, silica, magnesium carbonate, barium sulfate, titanium oxide, alumina, montmorillonite, gypsum, glass flake, glass fiber, carbon fiber, alumina fiber, silica alumina fiber, aluminum borate whisker and potassium titanate fiber. These inorganic fillers can be used as long as transparency and mechanical strength of the molding such as a film made of the liquid crystal polyester are not drastically impaired.

It is also possible to optionally add various additives such as an organic filler, an antioxidant, a heat stabilizer, a photostabilizer, a flame retardant, a lubricant, an antistatic agent, an inorganic or organic colorant, a rust preventing agent, a crosslinking agent, a blowing agent, a fluorescent agent, a surface smoothing agent, a surface gloss improver and a mold release improver (for example, fluororesin) to the liquid crystal polyester produced by the production method of the present invention during the production process of the liquid crystal polyester or after processing process after the production.

According to the present invention, it is possible to stably and continuously discharge the polymer formed by polycondensation from a polymerization tank in a molten state.

EXAMPLES

The present invention will be described below by way of Examples, but the present invention is not limited to these Examples. Various physical properties in Examples were measured by the following methods.

Examples 1 to 5

In a 200 L reactor equipped with a stirrer including a three-stage paddle blade, a nitrogen gas introducing tube, a thermometer and a reflux condenser, 35.5 kg (0.348 kmol) of acetic anhydride was charged under a nitrogen atmosphere. 31.0 kg (0.224 kmol) of p-hydroxybenzoic acid and 17.2 kg (0.092 kmol) of 2-hydroxy6-naphthoic acid were charged therein, and also a mixed solution of 0.100 kg of acetic acid and 4.8 g of 1-methylimidazole was added in the reactor. The temperature was raised to 140° C. under a nitrogen gas flow, and the mixture was refluxed at the same temperature for 60 minutes.

Then while distilling off acetic acid and unreacted acetic anhydride, the temperature was raised from 140° C. to 280° C. over 3 hours and maintained at 280±2° C. After confirming that a recovery ratio of acetic acid to be distilled out of the system became 95% or more, a bottom valve of the reactor was opened and a prepolymer was fed to a double belt type cooler manufactured by Nippon Belting Co., Ltd., and then a state of discharge of a prepolymer and a state of grinding at a pin crusher existing at a belt cooler outlet were observed. The flow initiation temperature of the obtained prepolymer was measured. Examples 1 to 5 were performed by changing a recovery ratio of acetic acid. The results are shown in Table 1.

The above-mentioned flow initiation temperature was measured by the following procedure using a flow tester Model CFT-500 manufactured by Shimadzu Corporation. About 2 g of a liquid crystal polyester was filled in a cylinder with a die including a nozzle having an inner diameter of 1 mm and a length of 10 mm attached thereto, and the liquid crystal polyester was extruded through the nozzle while being melted at a temperature rise rate of 4° C./minute under a load of 9.8 MPa (100 kgf/cm$^2$), and then the temperature at which the liquid crystal polyester shows a melt viscosity of 4,800 Pa·s (48,000 poise) was measured and this temperature was regarded as the flow initiation temperature.

Comparative Examples 1 to 3

In the same manner as in Examples, except that, after confirming that the amount of by-produced acetic acid to be distilled out of the system is less than 95% of a theoretical yield, a bottom valve of the reactor was opened and a prepolymer was discharged on a belt cooler, the operation was performed. Comparative Examples 1 to 3 were performed by changing the recovery ratio of acetic acid. The results are shown in Table 1.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Inner temperature upon discharge (° C.) | 283 | 279 | 282 | 281 | 280 | 280 | 282 | 280 |
| Prepolymer flow initiation temperature (° C.) | 232 | 243 | 239 | 249 | 228 | 209 | 213 | 203 |
| Pressure upon discharge | 0.05 | 0.05 | 0.05 | 0.05 | 0.05 | 0.02 | 0.05 | 0.05 |
| Amount of by-produced acetic acid |  |  |  |  |  |  |  |  |
| Theoretical value (kg) | 46.3 | 46.3 | 46.3 | 46.3 | 46.3 | 46.3 | 46.3 | 46.3 |
| Distillation amount (kg) | 44.8 | 45.4 | 45.2 | 45.2 | 44.6 | 43.1 | 43.4 | 43.6 |
| Recovery rate (% by weight) | 96.8 | 98.1 | 97.6 | 97.6 | 96.3 | 93.1 | 93.7 | 94.2 |
| Fluidity of prepolymer | Continuous | | | | | Discontinuous | | |

The above-mentioned recovery ratio of acetic acid was determined by the following procedure. That is, a substance to be distilled out of the system was recovered by a reflux condenser connected to a reactor, and then the recovery ratio of acetic acid was determined based on the mass of the recovered substance by the following equation. All units of the amount are kg.

Recovery ratio of acetic acid (% by mass)=Amount of recovered substance/Amount of acetic acid (theoretical value)+amount of unreacted acetic anhydride (theoretical value)

Acetic acid by-produced in a polycondensation reaction, the unreacted acetic anhydride and the unreacted raw compound (monomer) are contained in the "recovered substance" of the above-mentioned equation. In the present Example, the proportion of the monomer contained in the recovered substance was measured and it was confirmed that the proportion is less than 1% by mass of the recovered substance. Therefore, in the present Example, the recovery ratio of acetic acid was calculated on the assumption that the monomer is not contained in the recovered substance.

The above-mentioned "amount of acetic acid (theoretical value)" means the amount of acetic acid formed when the polymerization conversion rate becomes 100% on the assumption that all phenolic hydroxyl groups of p-hydroxybenzoic acid and 2-hydroxy-6-naphthoic acid as the monomer are acetylated in a stoichiometric relation.

The above-mentioned "amount of unreacted acetic anhydride (theoretical value)" means the amount of the unreacted acetic acid remaining in the system on the assumption that all phenolic hydroxyl groups of p-hydroxybenzoic acid and 2-hydroxy-6-naphthoic acid are acetylated in a stoichiometric relation.

As is apparent from the above description, in any of Examples 1 to 5, a prepolymer was continuously discharged on a belt cooler and cooled to form a continuous belt-shaped solid, and then ground into a sheet having a thickness of 1 mm to 2 mm without causing blocking of a pin crusher existing at a belt cooler outlet. Usefulness of the present invention was confirmed from these results. On the other hand, in any of Comparative Examples 1 to 3, a prepolymer was discontinuously discharged on a belt cooler. As a result, the prepolymer cooled on the belt cooler contained a plurality of solids in the form of a disk to cause blocking of a pin crusher existing at a belt cooler outlet.

What is claimed is:

1. A method for producing a liquid crystal polyester, which includes the following steps of:
   (1) polycondensing a mixture of 65 to 80 mol % of a compound represented by the following formula (I) with 20 to 35 mol % of a compound represented by the following formula (II) (the total of both compounds is 100 mol %) in a polymerization tank at 260 to 350° C. to form a prepolymer while distilled off by-products to be formed, wherein (1-1) the by-products contain a compound in which $R^1$ and X eliminated from the compound represented by the formula (I) and the compound represented by the formula (II) are bonded, and (1-2) a ratio of by-products to be distilled off to the theoretical amount of by-products formed when the compound represented by the formula (I) is polycondensed with the compound represented by the formula (II) in a stoichiometric relation becomes 95% or more;
   (2) continuously discharging the prepolymer from the polymerization tank in a molten state, solidifying the prepolymer while successively transferring in one direction, and continuously grinding the solidified prepolymer by a grinder provided at the downstream in a transfer direction to produce prepolymer particles; and (3) heat-treating the prepolymer particles in their solid state under an inert gas atmosphere, thereby subjecting them to solid phase polymerization:

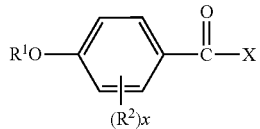
(I)

wherein $R^1$ represents a hydrogen atom, a formyl group, an acetyl group, a propionyl group or a benzoyl group; $R^2$ represents a chlorine atom, a bromine atom, or a group selected from the group consisting of a methyl group, an ethyl group, a propyl group, an isopropyl group, a butyl group, an isobutyl group and a tertiary butyl group; X represents a hydroxy group, an organyloxy group, a halogen atom or an acyloxy group; and x is an integer of 0 to 4 and, when x is 2, 3 or 4, a plurality of $R^2$(s) are the same or different from each other; and

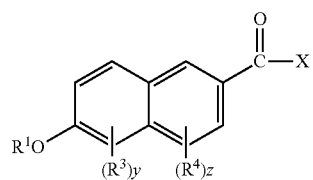
(II)

wherein $R^1$ and X respectively have the same meanings as those of $R^1$ and X in the formula (I), and are respectively the same as or different from each other from $R^1$ and X in the formula (I); $R^3$ and $R^4$ each independently represents a chlorine atom or a group selected from the group consisting of a methyl group, an ethyl group, a propyl group, an isopropyl group, a butyl group, an isobutyl group and a tertiary butyl group; y is an integer of 0 to 3 and, when y is 2 or 3, a plurality of $R^3$(s) are the same or different from each other; and z is an integer of 0 to 3 and, when z is 2 or 3, a plurality of $R^4$(s) are the same or different from each other.

2. The method according to claim 1, wherein the by-products contain a fatty acid.

3. The method according to claim 1, wherein the compound represented by the formula (I) is 4-acetoxybenzoic acid formed by an acetylation reaction of a phenolic hydroxyl group of 4-hydroxybenzoic acid with acetic anhydride in the step (1), the compound represented by the formula (II) is 6-acetoxy-2-naphthoic acid formed by an acetylation reaction of a phenolic hydroxyl group of 6-hydroxy-2-naphthoic acid with acetic anhydride in the step (1), and the charge amount of acetic anhydride in the step (1) is an equivalent amount or more based on the total of the amount of the phenolic hydroxyl group of 4-hydroxybenzoic acid charged and the amount of the phenolic hydroxyl group of 6-hydroxy-2-naphthoic acid charged.

4. The method according to claim 1, which includes the step of melting the formed liquid crystal polyester, and granulating the molten liquid crystal polyester after the step (3).

* * * * *